Aug. 15, 1950 E. CARTOTTO 2,518,865
SATURABLE REACTOR CONTROLLING CIRCUITS
Filed Jan. 25, 1945 3 Sheets-Sheet 1
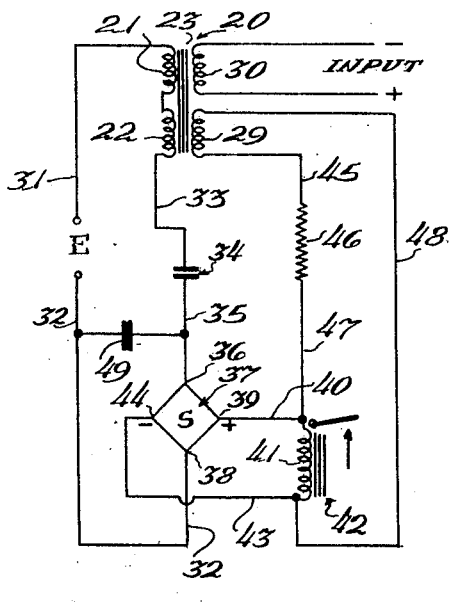
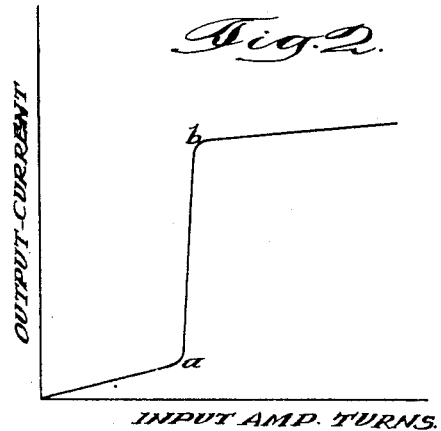
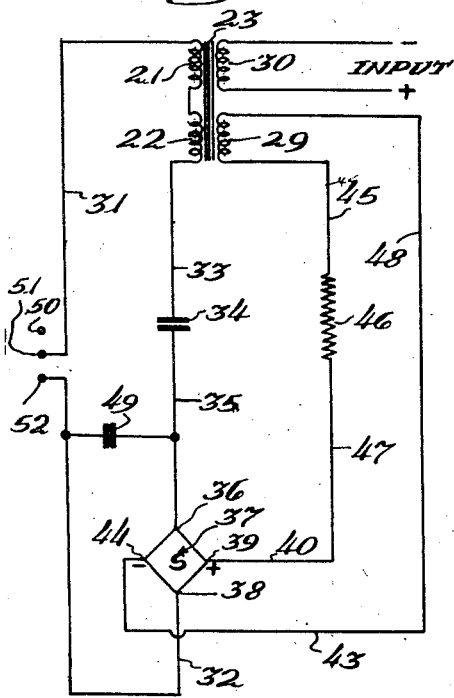
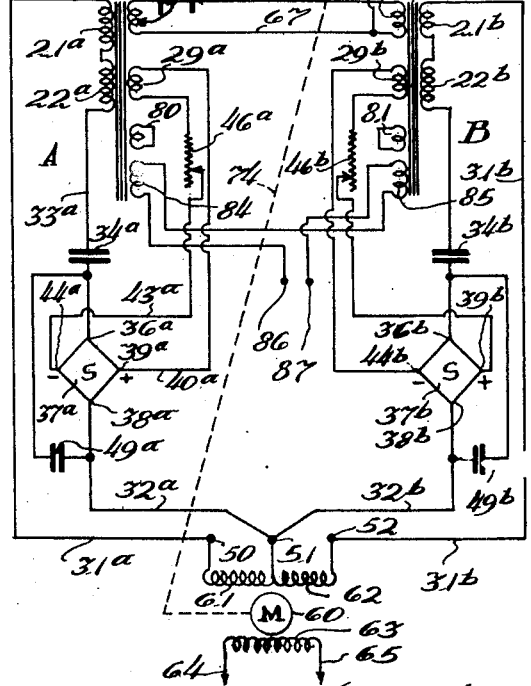
Inventor
Edward Cartotto
By McCabe, Wendt & Dickinson
Attorneys Inventor
Edward Cartotto
By McCabe Wendt & Dickinson
attorneys Aug. 15, 1950 E. CARTOTTO 2,518,865
SATURABLE REACTOR CONTROLLING CIRCUITS
Filed Jan. 25, 1945 3 Sheets-Sheet 3
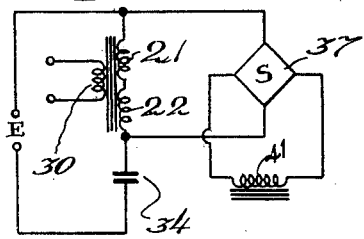
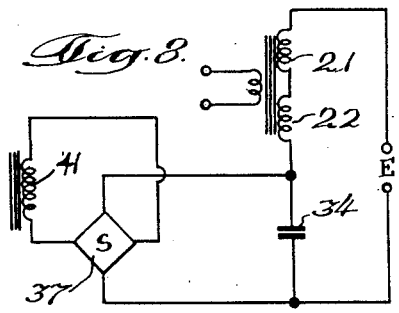
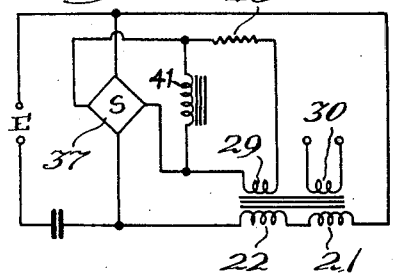
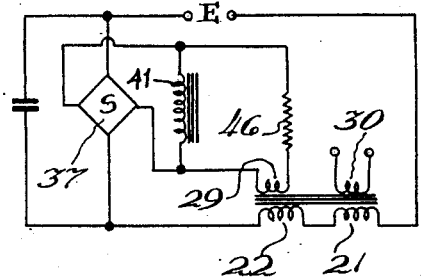
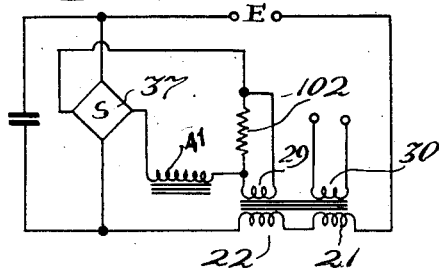
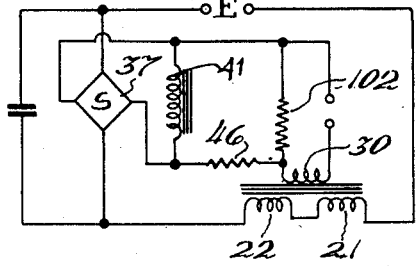
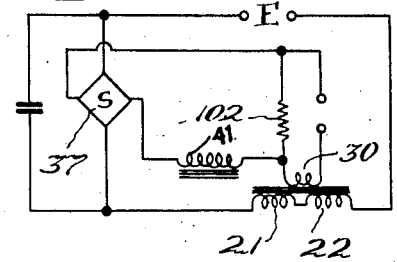
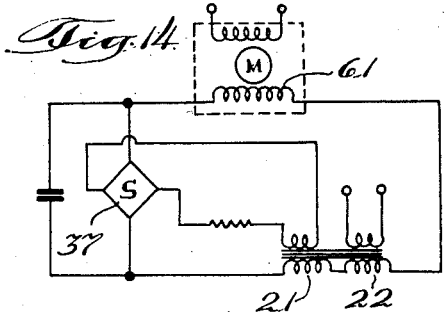
Inventor.
Edward Cartotto
By McCaleb, Wendt & Dickinson
Attorneys Patented Aug. 15, 1950

2,518,865

UNITED STATES PATENT OFFICE 2,518,865

SATURABLE REACTOR CONTROLLING CIRCUITS

Edward Cartotto, Chicago, Ill., assignor to Illinois Testing Laboratories, Inc., Chicago, Ill., a corporation of Illinois Application January 25, 1945, Serial No. 574,462

8 Claims. (Cl. 318—29)

The present invention relates to controlling circuits, and is particularly concerned with controlling circuits of the type including a resonant-regenerative saturable core reactor.

The present invention relates to an improvement in circuits of the type covered by the prior application of Victor W. Breitenstein, Ser. No. 283,335, filed July 8, 1939, for Amplifying and Detecting Systems, which issued as United States Letters Patent No. 2,341,526, on February 15, 1944.

One of the objects of the invention is the provision of an improved saturable core reactor circuit of the resonant type which is capable of being used as a stepless remote control device or as a telemetering system or as a combination of both.

Another object of the invention is the provision of an improved resonant saturable core reactor circuit which, by virtue of its regenerative action, is adapted to provide a circuit having greater sensitivity than the circuits of the prior art.

Another object of the invention is the provision of an improved circuit of the class described in which the input circuit is self-polarized so that if the input voltage has the proper polarity, the circuit will operate, but if the polarity is reversed, the entire system becomes very insensitive and consequently inoperative.

Another object of the invention is the provision of an improved circuit of the class described in which a small increase in the input current produces a large, abrupt increase in output current, and a subsequent decrease in input current produces a large, abrupt decrease in output current, thus indicating the existence of a reversible discontinuity.

Another object of the invention is the provision of an improved circuit of the class described, in which the output current displays no abrupt increases or discontinuity; but, on the contrary, increases quite steadily in proportion to the input ampere turns.

Another object of the invention is the provision of an improved combination of circuits adapted to be used with motors of the type employing shading coils to drive the motor in either direction selectively.

Another object of the invention is the provision of an improved circuit of the class described which is adapted to maintain its calibration for a long period of time without necessity for frequent recalibration.

Another object of the invention is the provision of an improved controlling circuit of the class described which produces sufficient output current so that it is very positive in its action.

Another object of the invention is the provision of a plurality of modified forms of circuits which, while not having all of the advantages of the preferred form, are, nevertheless, adapted to present some of these advantages and other additional advantages by variation of the circuits.

Other objects and advantages of the invention will be apparent from the following description and the accompanying drawings, in which similar characters of reference indicate similar parts throughout the several views.

Referring to the drawings, of which there are three sheets,

Fig. 1 is a wiring diagram of a fundamental controlling circuit employing the resonant-regenerative saturable core reactor, which is included for the purpose of explaining its action;

Fig. 2 is a reproduction of an input-output curve for the circuit of Fig. 1;

Fig. 3 is a wiring diagram similar to Fig. 1 of a modified form of circuit, which provides a basis for the more comprehensive circuit of Fig. 4;

Fig. 4 is a wiring diagram of a preferred form of the invention, in which the circuit is adapted to control and to actuate a motor of the type having shading coils;

Fig. 7 is a wiring diagram of a variation of the circuit, showing that the rectifier may be connected in parallel with the A. C. coils of the core reactor;

Fig. 8 is another similar wiring diagram, showing that the rectifier may also be connected in parallel with the condenser of the core reactor circuit;

Fig. 9 is another variation of the core reactor circuit, in which the circuit is so arranged that a small amount of the relay current is fed back into the control circuit for regeneration;

Fig. 10 is another variation of the same circuit as Fig. 9, with the condenser connected across the rectifier;

Fig. 11 illustrates another possible variation of the core reactor circuit, showing another means of deriving regenerative current from a separate resistance that is in series with the relay coil;

Fig. 12 illustrates the fact that the input current may be applied to the same coils as the regenerative current by the output terminals being placed in series with those coils;

Fig. 13 shows another variation in which the input is connected in parallel with the mutual resistance, both of these being in series with the relay coil and the rectifier;

Fig. 14 shows another variation of the core reactor circuit, in which a motor is utilized instead of a relay.

Referring to Fig. 1, this is a wiring diagram of a simplified circuit embodying the present invention. In this wiring diagram the core reactor is indicated at 20, and it is preferably provided with a plurality of alternating current energizing coils 21, 22, arranged upon a suitable core 23.

Figure 6:
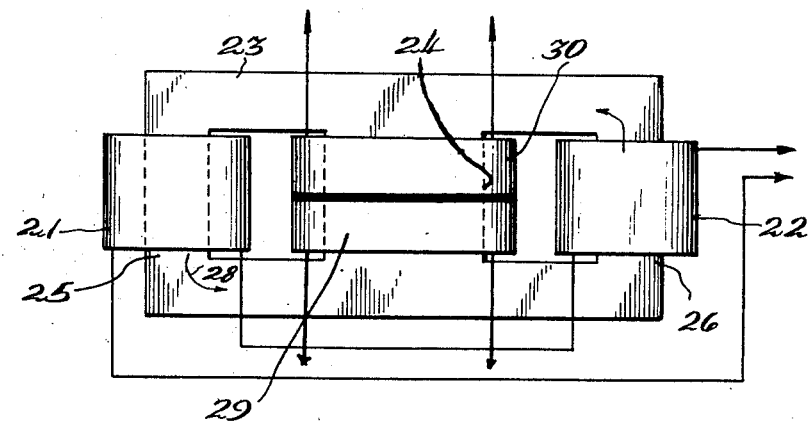
Fig. 6 is a diagrammatic illustration of a core reactor of the type utilized in the circuit.

The core 23 is preferably of the closed type, as shown in Fig. 6, having a central leg 24 of twice the cross-sectional area of the two end legs 25, 26. The alternating current coils 21 and 22 are shown as being carried by the outer legs 25, 26.

These coils 21, 22 are wound in such a direction and so connected in series and in the same direction of rotation as to produce a flux in both of the outer legs 25, 26 which extends in the same direction about the outer circuit of the core, as indicated by the arrows 28, the windings 21, 22 being balanced.

The flux produced in the center leg 24 by the two coils 21 and 22 is zero because the directions of their flux in leg 24 is opposite and equal and thus provide complete cancellation.

The center leg 24 may also include the biasing windings 29 and the control winding 30, both of which may be distributed so that the control winding is superposed on the biasing winding in Fig. 6.

Reference may be had to the prior patent of Victor W. Breitenstein, above-mentioned, for further details as to the electrical constants and characteristics of such core reactors when employed in a resonant circuit.

The diagram of Fig. 6 illustrates a core reactor utilizing biasing winding 29 and control winding 30 on the central leg. There may be several coils used or required in a practical embodiment and they may be located side by side or superimposed either one upon the other.

The circuit of Fig. 1 may be energized by a source of alternating current through the conductors 31, 32, this source being indicated by E, and conductor 31 is connected to one of the terminals of the A. C. windings 21, 22. The other terminal of these windings is connected by conductor 33 to a condenser 34, which is included for the purpose of tuning the circuit to resonance.

The output circuit for the core reactor is provided by connecting conductor 35 to condenser 34 and to one of the terminals 36 of a rectifier 37. The other terminal 38 of the rectifier is connected to conductor 32. The positive terminal 39 of the rectifier 37 is connected by conductor 40 to the coil 41 of a relay 42. The other terminal of the coil 41 is connected by conductor 43 to the negative terminal 44 of the rectifier 37.

When such a core reactor circuit is provided with a predetermined amount of bias, its core may be raised to a critical point of saturation so that, if an additional increment of ampere turns is applied at the control winding 30, as for example by means of a thermocouple, there will be a large change of current in the output circuit.

In the present case, however, the current for the biasing coil 29 is provided by a feed back, as the coil 29 has its terminals connected to a conductor 45, which is connected to a resistance 46, which is connected to a conductor 47 leading to the relay coil 41. The other terminal of biasing coil 29 is connected by the conductor 48 to the other terminal of the relay coil 41 so that the biasing coil 29 is in parallel with the relay coil 41, receiving its proportionate share of the output current, depending on the relative physical constants of the two parallel circuits.

49 indicates a condenser which is connected across the input to the rectifier 37 for the purpose of by-passing a component which has double the frequency of that which is applied to the A. C. coils 21, 22. The use of this by-pass condenser 49 increases considerably the efficiency of the circuit.

The source of alternating current which is applied to the conductors 31, 32 may consist of any suitable constant alternating current voltage of from 15 to 20 volts, 60 cycles.

The operation of a circuit of the type of Fig. 1 is as follows: A small part of the output current, which would otherwise go to the relay coil 41, is fed back to the coil 29 in such manner that the flux it produces aids the flux which is produced by the current in the coil 30, the resistor 46 controlling the magnitude of the feedback and consequently controlling the amount of the aiding flux.

The condenser 49, which is shunted across the rectifier, is used to increase the output, which would otherwise be quite small.

It is found that with such a circuit an input of approximately one milliampere at the input coil 30 provides an output current of approximately 65 milliamperes direct current. This input is approximately equal to ten ampere turns. The circuit can be made to operate as an oscillating control, a trigger control, or a proportional control. For example, suitable physical constants for the elements of the circuit may be substantially as follows:

Coils 29 and 30, total ampere turns, 10,000 turns;
Coils 21, 22—500 turns;
Core 23—40 laminations;
Condenser 34—20 mfd—200 volts;
Condenser 49—12 mfd—200 volts;
Resistance 46—1300 ohms;
Rectifier 37—full wave, bridge type;
Relay 42—D. C. Relay—200 ohms;
Applied voltage 15 to 20 volts A. C., 60 cycle.

Greater sensitivity can be secured by reducing the value of the resistor 46, thus increasing the regeneration; but if this resistance is made too small, the circuit will lock in, and it is not possible to regain control of the output by reducing the current in the input coil. In such case it would be necessary to short circuit the condenser 34 to regain control of the output or to open the A. C. circuit momentarily.

It should be understood that in every case, in all of the wiring diagrams, the elements of the circuit, which are indicated by symbols showing constants, such as condensers, resistances, and inductances, may be made adjustable.

Referring to Fig. 2, this is a curve which shows the relation of output current for predetermined values of input ampere turns, which represents the characteristics of the circuit of Fig. 1, using a properly adjusted value of the resistance 46.

Thus, in Fig. 2, at the point a, the input ampere turns become critical, and a very small increase in input ampere turns results in a tremendous increase in the output current up to the point $b$.

Increase of the input ampere turns beyond the value represented by $b$ again increases the output current, but only by a small amount. The range of operation of the circuit is preferably on that portion of the curve beginning slightly before $a$ and slightly beyond $b$.

Referring to Fig. 3, the large change of current available with the circuit of Fig. 1 may be used with the circuit of Fig. 3 for operating a shading coil motor directly, and the motor may be used to drive any type of controlling apparatus, such as switches or rheostats or potentiometers, thereby eliminating the relay.

Referring to Fig. 3, this is a circuit showing the mode of connection of a circuit containing the same elements, to a shading coil of a motor of this type. In this circuit 50 indicates the terminal of the shading coil, which was not connected in the circuit. 51 indicates a common terminal for the shading coils, and 52 the other terminal of the shading coil, which is connected in the circuit.

When normal voltage is applied to the input terminals of such a motor, the shading coils deliver about 20 volts A. C., which is practically equivalent to the A. C. voltage which was applied at the terminals E in Fig. 1. In this circuit the circuit continues to display the various characteristics previously described with respect to Fig. 1, except that the current flowing in the shading coil is considered the output current.

For example, with one circuit having the circuit constants previously mentioned, an input of one milliampere D. C. at the input coil 30, about 90 milliamperes A. C. will flow through the shading coil connected to the terminals 51, 52. This is sufficient to produce a torque in excess of five inch ounces.

One of the most important features of this circuit is that it is self-polarizing. When the input voltage has such a polarity that the input ampere turns of the coil 30 and the regenerative ampere turns of the coil 29 are additive, the output current will display its normal characteristics, and the motor will rotate.

If, however, the input leads to the coil 30 are reversed so that input ampere turns and regenerative ampere turns are subtractive, the entire system becomes very insensitive. For example, when the connections are arranged so that the two sources of ampere turns 29 and 30 are additive, about five times the input ampere turns are required for starting the motor than are required for producing full torque and output current. However, when the subtractive condition exists between these two sources of ampere turns 29 and 30, about fifteen times the ampere turns are required to provide full torque and output. Also, when such a subtractive connection is used, the output current displays no abrupt increase or discontinuity, as shown in Fig. 2; but it rises quite steadily in proportion to the input ampere turns.

The circuit of Fig. 3 may thus be used for starting and stopping a motor of this type responsive to very small D. C. input power levels.

Referring to Fig. 4, this is a circuit in which there are two circuit parts similar to that of Fig. 3 so arranged that the motor may be driven forward, backward, or stopped, as the controlling element may require.

In this circuit the electrical elements and conductors at the right hand side are substantially the same as shown in Fig. 3, with certain exceptions, which will be discussed in detail. Two core reactors 23a and 23b are required, and all of the other elements of the circuits which are similar to Fig. 3 have been indicated by the same numerals, with the letters $a$ and $b$ affixed thereto.

In this circuit, the shading coils of the motor 60 are indicated by the numerals 61, 62, these coils having a common connection to the terminal 51, and being connected to the conductors 31a and 31b.

The motor energizing windings 63 are shown with terminals 64, 65, upon which a suitable electromotive force must be impressed for energizing the motor. One-half of the circuit is adapted to drive the motor in one direction, and the other half of the circuit is adapted to drive the motor in the other direction.

The input coils 30a and 30b are shown as being connected in parallel by conductors 66, 67, but they may also be connected in series, which will reduce the amount of the current drawn from the potentiometer bridge 68.

The conductor 66 from one terminal of each of the D. C. input coils 30a, 30b is connected by a conductor 69 to the movable contacts 70 of a slide wire rheostat 71, preferably having a resistance which varies uniformly throughout its length.

The movable contact 70 is also preferably provided with a pointer and a scale for indicating the temperature or other condition relative to which the circuit is to be controlled. The other conductor 67, which connects the coils 30a, 30b in parallel, is connected by conductor 71 to the movable contact 72 of a second slide wire potentiometer 73 of the same type.

The dotted line 74 indicates a mechanical connection from the motor 60 to the movable contact 72, such as, for example, the motor shaft member drive, by means of a movable arm.

The potentiometer 71 may be the master potentiometer, and potentiometer 73 the slave potentiometer in that the slave potentiometer is adapted to be driven by the motor M, and it positions itself according to the demands made upon it by the master potentiometer 71.

One end of both slide wire coils is connected by conductor 75 to the positive terminal 76 of a source of direct current supply, such as a battery, indicated at 77. The other two terminals of the slide wire potentiometers 71, 73 are connected by conductor 78 to the negative terminal 79 of the D. C. source 77.

Thus the slide wire resistors 71, 73 are arranged in the form of a bridge, two of the opposite junctures 76, 79 of which are connected to the D. C. source, and the other two junctures are formed by the movable contacts 70, 72.

The movable contact 72 of the slave potentiometer may also be provided with a pointer and a scale, and when the two movable contacts 70, 72 occupy corresponding points on the slide wire resistors 71, 73, the current flow in coils 30a and 30b is zero.

In other embodiments of the invention the motor M may merely carry a pointer on a scale for use as an indicator, or the motor may control the position of a pen bearing on a recorder chart, which is moved in accordance with the lapse of time.

The master potentiometer may be provided with a knob, pointer, and scale for use as a remote indicating circuit.

Certain modifications and changes were found to be desirable in the present circuit as distinguished from that of Fig. 3 or Fig. 1, for the following reasons: The amount of resistance of the resistors 46a and 46b may be individually adjusted so that the regeneration is found to give a high output current, with the characteristic shown in Fig. 2.

These resistors are also useful to calibrate the reactors to substantially equal ampere turn sensitivity.

Another additional feature which is desirable consists in the short circuited coils 80, 81 on the two reactors. These are included for the purpose of substantially reducing the energy interchange from section A to section B through the input coils 30a, 30b. By transformer action this energy was fed to the regeneration coil 29a or 29b where, because of the presence of the rectifier, direct current was caused to flow in this coil.

This current would produce a small amount of saturation, and would allow a small output current to flow, which in turn provides additional current flow in the regeneration coil. The magnitude of this additional output current is small, but its existence tends to prevent the motor from developing its full torque. For this the short circuited windings 80, 81 are preferably included on each reactor.

Such short circuited windings may be located on the center leg of each reactor, and may be made of a strip of copper. The strip may be looped around the outside of the input coil 30a or 30b, and its ends soldered. Such a short circuited member does not eliminate entirely the energy interchange, but it reduces it to a negligible amount, such as twenty-five percent or less of its original value.

It has already been pointed out that the circuit of Fig. 3 is self-polarizing and sensitive to the flow of direct current in the input coil in one direction and relatively insensitive to current flowing in the opposite direction. The circuit connections of the regenerative coils 29a and 29b are arranged to take advantage of this polarization.

It will be noted that the input coil 29a is connected to the positive side of its rectifier 37a, while the input coil 29b is connected to the negative side of its rectifier 37b.

The purpose of arranging these connections in this manner is to take advantage of the polarization feature so that when current of one polarity is fed to the input coils there will be an additive effect between the ampere turns of the D. C. input coil and the regenerative coil of one reactor and a subtractive effect between the ampere turns of the D. C. input coil and the regenerative coil of the other reactor.

This degree of polarization of the input can be increased in degree or made still more positive by installing the half wave rectifier units 82, 83 in the conductor 66, which connects the conductor 69 to the upper terminal of the D. C. input coils.

Rectifier units 82 and 83 are connected in series so that current will flow freely from right to left in the diagram but will not flow in the opposite direction. This allows current to flow through rectifier 82 and input coil 30a when slider 70 is positive with respect to slider 72 but prevents the flow of current through coil 30b because rectifier 83 resists the flow of current through it from left to right. Likewise, this allows current to flow through rectifier 83 and coil 30b when slider 72 is positive with respect to slider 70 but prevents the flow of current through rectifier 82 and coil 30a.

These rectifiers bring about a situation where there are practically no input ampere turns in the D. C. input coil of one reactor at the same time there is a maximum input of ampere turns in the D. C. input coil of the other reactor, and the rectifiers increase the efficiency; but they are not necessary in every embodiment of the invention.

Additional D. C. input coils 84 and 85 may be placed on the reactors and connected in series or in parallel and provided with terminals 86 and 87 whereby the motor may be actuated responsive to other conditions or the coils may serve as a biasing means to preselect a definite operating point in the system of coils 30a and 30b.

Various other detailed changes are desirable in determining the constants of such a circuit, such as, for example, the changes may be made in the input coil and the regenerative coil so that it is possible to operate at a lower value of input voltage. In order to give one example of the values of the electrical constants for such a circuit, the following specification is given:

A. C. coils 21a, 22a, 21b, and 22b may each consist of 500 turns. D. C. input coils 30a and 30b may each consist of 900 turns. D. C. regeneration coils 29a and 29b may each consist of 2500 turns. The short circuiting coils 80 and 81 have already been described in detail.

The condensers 34a, 34b may consist of 18 mfd. 200 volt condensers. The condensers 49a, 49b may consist of 12 mfd. 200 volt condensers. The rectifiers 37a and 37b may consist of full wave, bridge type rectifiers. The resistance 46a may consist of a 1200 ohm resistance suitably adjusted to provide regeneration. Resistance 46b may consist of 1300 ohms, suitably adjusted to provide regeneration. The slide wire potentiometers 71, 73 may be 300 ohm potentiometers, and the D. C. source 77 may consist of 28 volts D. C.

The motor "M" should be of the shading coil type and should have an output voltage from the shading coils of about 20 volts. The core may consist of 40 laminations.

The operation of the circuit of Fig. 4 is as follows: The motor may be supplied with input power from the 115 volt 60 cycle line. By making a slight modification in the value of the resistors 46a, 46b the circuit can also be satisfactorily operated from a D. C. line by using a vibrator unit.

Assuming that the motor is suitably supplied with power and that voltage is applied to the potentiometers 71, 73, when the wiping contacts 70, 72 are so positioned that no current flows between them, a state of balance exists in the potentiometer bridge, and a state of quiescence exists in both sections A and B, and the motor is at rest.

Due to the voltage impressed on the two potentiometers 71, 73 by the D. C. source 77, there is a gradient of potential in each slide wire resistor 71, 73. When the two movable contacts 70, 72 are at corresponding positions, they are also at substantially the same potential so that, there being no difference of potential between these contacts, there will be no current flowing in the conductors 69, 71 or in the D. C. input coils 30a, 30b.

Suppose the contact 70 of the potentiometer 71 is moved downward in Fig. 4 or clockwise on a circular scale. This would make the contact 72 positive with respect to the contact 70; and in the absence of the rectifiers 82, 83 it would cause current to flow upward in both D. C. input coils 30a, 30b. This small input provides a small output in both of the sections A and B of the circuit, causing regenerative current to flow in both regenerative coils 29a, 29b.

Throough proper connections between the regenerative coils 29a and 29b to their respective rectifiers, this regenerative current is made to flow upward, for example, in section B, regenerative coil 29b, and downward in the regenerative coil 29a of Section A.

Thus the ampere turn input to the reactor of section B acts additively with respect to the ampere turns from the input coil of section B. The ampere turns of the regenerative coil of section A under these conditions acts subtractively with respect to the ampere turns from the input coil of section A. Therefore, in section B the core saturation increases rapidly, while in the reactor section A it builds up very slowly.

As this saturation increases, the inductance of the A. C. coils 21B, 22b decreases, and the circuit finally becomes resonant for the particular value of the capacity 34b at 60 cycles. The condenser 49b shunting the rectifier 37b produces an abrupt rise in the regenerative coil, which increases as the circuit approaches resonance. This abrupt rise of regenerative current provides a very rapid approach to the resonant point, and consequently a sharp increase in the output current.

When the output current from section B is high, the motor will rotate and will turn the slave potentiometer so that its wiping contact 72 will move downward, approaching a location on its potentiometer similar to that of the moving contact 70 on the potentiometer 71. This will remove the potential difference between the contacts 70, 72, eliminating the input current to the input coils 30a, 30b, and causing the output current to return to a minimum. This causes the motor to stop.

If the master potentiometer had been moved in the opposite direction, the section A would have been energized in a manner similar to that described above, and the motor would have been turned in such a direction as to move the wiping contact 72 in the opposite direction until a new condition of balance existed.

When the additional rectifiers 82, 83 are used, the polarization is still more positive for the following reason: Assume that the master contact 70 is moved downward so as to decrease its potential with respect to contacts 72. Current would then flow downward in conductor 71 and upward in coil 30b through the rectifier 83 to the contact 70, but there would be no current whatever in the input coil 30a because of the opposition opposed in the circuit by the rectifier 82.

Instead of the section B building up more rapidly than section A, section B would build up to a large output current, while section A would be in a state of quiescence, although energized by alternating current.

Suppose, on the contrary, the contact 70 were moved upward. This would increase the potential of contact 70 with respect to contact 72 and cause the current to flow downward in conductor 69 through rectifier 82, downward in coil 30a, and upward in the conductor 71.

Under these conditions, section A would build up to a large output current, while section B would be in a state of quiescence, and the motor would be turned in the opposite direction so as to move the contact 72 in the opposite direction, that is, upward.

Thus it will be seen that the slave potentiometer can be made to follow the master potentiometer to maintain a state of balance and to indicate at a remote point the condition of the circuit or of the device responsive to which the circuit is being actuated. In either case the abrupt rise in output current makes the circuit very positive in its action and energizes the motor circuit very quickly. Similarly, the equally abrupt decrease in output current allows the motor circuit to be quickly de-energized and the motor to be quickly stopped.

Figure 5:
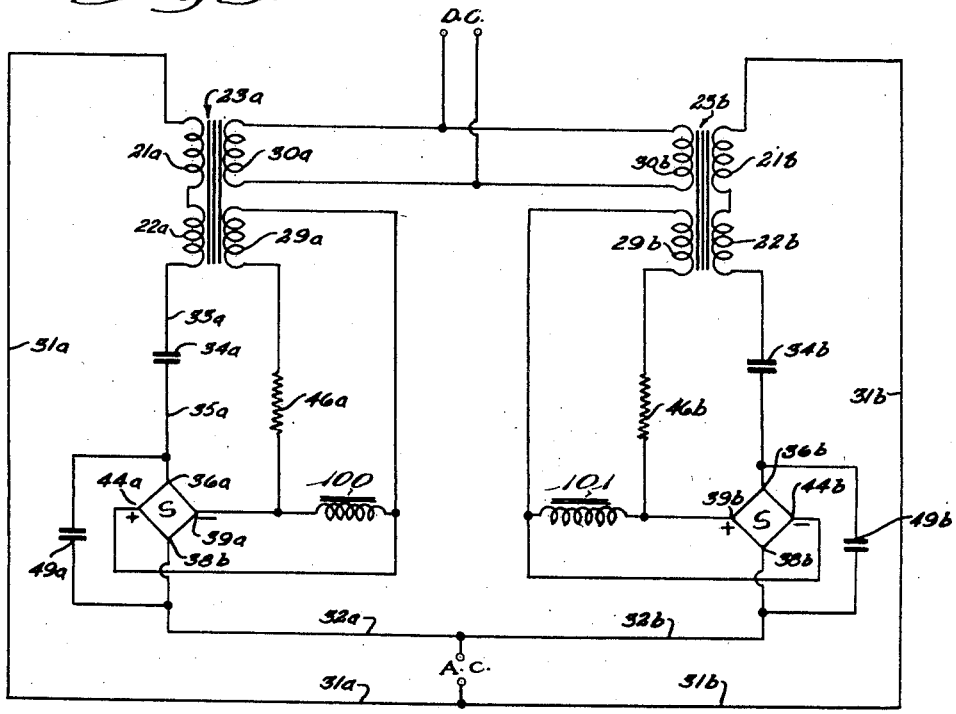
Fig. 5 is another wiring diagram, showing the circuit which would be employed to use the invention for controlling relays that will provide for switching or for the operation of a motor for remote control and indication.

Referring to Fig. 5, this is a simplified resonant-regenerative circuit of the type utilized in Fig. 4, which is shown to illustrate the general application of such a circuit. This circuit includes the same elements as Fig. 4, except that any alternating current energization of suitable voltage may be used, and such a circuit may be used to recognize and differentiate between two different polarities of D. C. input, and it may be used to perform a specific operation upon the loads, depending upon the polarity of the D. C. input. In this case the load is represented by the relays 100, 101 in the output circuit, which may provide switch means for the operation of a motor or motors for remote control and indication.

Referring now to Figs. 7 to 14, these are additional circuit diagrams of modifications showing the various modes of connection for the relay coils in the resonant-regenerative circuit. These circuits have a direct relation to Fig. 1, and the elements of these circuits, like those of Fig. 1, may be utilized in the circuits of Figs. 4 and 5 to provide various modified forms of resonant-regenerative circuits.

For example, in Fig. 1 the relay coil 41 is energized by a rectifier 37, which is in series with the alternating current coils and the condenser 34. In Fig. 7 the same numerals have been applied, and the rectifier 37 is connected in parallel with the coils 21, but in series with the conndenser 34.

Referring to Fig. 8, this shows another modized form of connecting the load in the circuit. In this case the rectifier 37 is connected in parallel with the condenser 34, but the rectifier and condenser are in series with the coils 21, 22. Either one of these circuits of Figs. 7 or 8 may be made to function in any one of the three manners previously described with respect to Fig. 1; that is, as an oscillating control, a trigger control, or a proportional control.

The basic difference between the performance of the circuits of Figs. 1, 7, and 8 is in the range through which the relay current changes, and in the value of the maximum and minimum current obtained for maximum and minimum saturation as obtained from the D. C. saturating current. While the circuits shown in Figs. 7 and 8 are not regenerative circuits, regeneration may be applied to these circuits after the manner shown in Figs. 9 and 10.

Figs. 9 and 10 show these circuits provided with the regeneration which is obtained by allowing a small amount of the relay current to be fed back into the control circuit. Figs. 9 and 10 illustrate the use of a separate input coil to accept the feed-back current.

This input coil has been indicated by the numeral 29. Other methods of variation in regeneration current are illustrated in Figs. 11, 12, and 13. Thus, in Fig. 11 there is an auxiliary resistance 102 in series with the relay coil, and the regenerative coil 29 is connected across the drop caused by the resistance 102.

In Fig. 10 this auxiliary resistance 102 is in series with the input coil 30, and the auxiliary resistance 102 is connected in parallel with the relay coil across the direct current terminals of the rectifier 37.

Fig. 13 is similar to Fig. 12, except that the relay coil is not bridged across the rectifier 37, but is in series with one of the conductors from the rectifier.

In all of these supplementary diagrams it has been assumed that the energization voltage would be derived from a voltage source such as a transformer winding. The contacts carried by the relay would then be called upon to operate a motor that was being controlled by the circuit.

Referring now to Fig. 14, this shows a method of connection that will eliminate the use of the relay. In this diagram, voltage is obtained from the shading coils of a shading coil motor for energizing the circuit. The shading coils are connected in series with the alternating current coils 21, 22.

While this circuit is shown with regeneration, it can also be operated without regeneration. This circuit, shown in Fig. 14, may be operated with any of the types of regeneration circuits that are described and with any of the basic resonant reactor circuits indicated in Figs. 1, 7, 8, 3, 4, and 5.

It will thus be observed that I have invented an improved resonant regenerative core reactor circuit including a number of modified forms of circuits which are capable of producing substantially the same result.

These circuits are capable of being used as a stepless remote control device or as a telemetering system or a combination of both. In the preferred form the circuit used is self-polarizing and may be made responsive to polarity so that a motor may be driven in either direction, depending upon the polarity of the direct current input.

The present circuits are very positive in their action because there is an abrupt rise in output current which positively and certainly starts the motor or actuates the relay which forms the load circuit. It is equally positive in de-energizing the relay or stopping the motor because there is an equally abrupt decrease in output current when circuit conditions have been satisfied for producing such a decrease.

The present circuits are adapted to maintain their calibration for a long period of time, and they are certain and dependable in their operation and capable of operating under the most adverse conditions.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a resonant regenerative saturable core reactor circuit, the combination of a saturable core reactor comprising a closed magnet core of the shell type having one central leg of twice the cross-sectional area of each of two lateral legs, with an alternating current energizing coil comprising parts mounted upon said lateral legs, said coil parts being so wound in the same direction of rotation as to produce a flux which extends in the same direction about a circuit including said lateral legs, a direct current input coil mounted on the central leg of said reactor, a rectifier consisting of four elements connected in series and having two D. C. junctures and two A. C. junctures, said rectifier having its A. C. junctures connected in a circuit in series with said alternating current energizing coil, a condenser having a capacity so proportioned with respect to the alternating current energizing coil that it is adapted to tune the circuit, a controlled circuit including a controlled member connected in series with one of the coils on said reactor, a predetermined input increase at the direct current input coil, causing the reactor circuits to got into resonance and resulting in a greatly increased current in the coils of said reactor and actuating said controlled member.

2. In a resonant regenerative saturable core reactor circuit, the combination of a saturable core reactor comprising a closed magnet core of the shell type having one central leg of twice the cross-sectional area of each of two lateral legs, with an alternating current energizing coil comprising parts mounted upon said lateral legs, said coil parts being so wound in the same direction of rotation as to produce a flux which extends in the same direction about a circuit including said lateral legs, a direct current input coil mounted on the central leg of said reactor, a rectifier consisting of four elements connected in series and having two D. C. junctures and two A. C. junctures, said rectifier having its A. C. junctures connected in a circuit in series with said alternating current energizing coil, a condenser having a capacity so proportioned with respect to the alternating current energizing coil that it is adapted to tune the circuit, a controlled circuit including a controlled member connected in series with one of the coils on said reactor, a predetermined input increase at the direct current input coil, causing the reactor circuits to go into resonance and resulting in a greatly increased current in the coils of said reactor and actuating said controlled member, and a controlling resistor located in the regenerative coil circuit in series with the regenerative coil for regulating the amount of regenerative coil current in proportion to that of the controlled member.

3. In a resonant regenerative saturable core reactor circuit, the combination of a saturable core reactor comprising a closed magnet core of the shell type having one central leg of twice the cross-sectional area of each of two lateral legs, with an alternating current energizing coil comprising parts mounted upon said lateral legs, said coil parts being so wound in the same direction of rotation as to produce a flux which extends in the same direction about a circuit including said lateral legs, a direct current input coil mounted on the central leg of said reactor, a rectifier consisting of four elements connected in series and having two D. C. junctures and two A. C. junctures, said rectifier having its A. C. junctures connected in a circuit in series with said alternating current energizing coil, a condenser having a capacity so proportioned with respect to the alternating current energizing coil that it is adapted to tune the circuit, a controlled circuit including a controlled member connected in series with one of the coils on said reactor, a predetermined input increase at the direct current input coil, causing the reactor circuits to go into resonance and resulting in a greatly increased current in the coils of said reactor and actuating said controlled member, said circuit also including a condenser shunted across the alternating current coil and across the A. C. junctures of the rectifier for by-passing an A. C. component of double the frequency of that impressed on the A. C. coil, and resulting in a further considerable increase in the magnitude of current in the reactor coils.

4. In a resonant regenerative saturable core reactor circuit, the combination of a saturable core reactor comprising a closed magnet core of the shell type having one central leg of twice the cross-sectional area of each of two lateral legs, with an alternating current energizing coil comprising parts mounted upon said lateral legs, said coil parts being so wound in the same direction of rotation as to produce a flux which extends in the same direction about a circuit including said lateral legs, a direct current input coil mounted on the central leg of said reactor, a rectifier consisting of four elements connected in series and having two D. C. junctures and two A. C. junctures, said rectifier having its A. C. junctures connected in a circuit in series with said alternating current energizing coil, a condenser having a capacity so proportioned with respect to the alternating current energizing coil that it is adapted to tune the circuit, a controlled circuit including a controlled member connected in series with one of the coils on said reactor, a predetermined input increase at the direct current input coil, causing the reactor circuits to go into resonance and resulting in a greatly increased current in the coils of said reactor and actuating said controlled member, and a controlling resistor located in the regenerative coil circuit in series with the regenerative coil for regulating the amount or regenerative coil current in proportion to that of the controlled member, the said resistor being of such a value as to provide a maximum sensitivity and a maximum output for a predetermined input, without causing the circuit to lock in.

5. In a controlling circuit, the combination of a shading coil motor with a first potentiometer and a second potentiometer connected to form a bridge, and energized by a source of direct current, said motor being mechanically connected to drive a movable contact on the second potentiometer in response to the movements of a movable contact on the first potentiometer, a pair of saturable core reactors, each core reactor being provided with a core and an alternating winding, both of said windings being connected to the common terminal of the shading coil motor windings, and the other terminal of each winding being connected to one of the other terminals of the shading coil motor windings, a source of alternating current energizing said shading coil motor, the motor windings providing alternating current for energizing the A. C. windings on said core reactor, a direct current winding on each of said core reactors, said direct current windings being connected in reverse direction to the contacts of said potentiometers and to each other, a condenser connected in series with each A. C. winding on the core reactor to tune the circuit, a rectifier bridge having its A. C. junctions connected in series with the A. C. windings on the core reactor, D. C. biasing windings on each of said core reactors, each biasing winding being connected to the D. C. junctions of the corresponding rectifier, the biasing windings being in series with a controlling resistance, whereby only a predetermined portion of the output available at said rectifiers is fed back to the biasing windings of each core reactor for increasing the sensitivity of the circuit, the shading motor being driven in one direction when the contact on the first potentiometer moves in a predetermined first direction, and in the other direction when the potentiometer contact moves in the opposite direction, whereby the contact of the second potentiometer follows the contact of the first potentiometer until a condition of balance is secured.

6. In a controlling circuit, the combination of a shading coil motor with a first potentiometer and a second potentiometer connected to form a bridge, and energized by a source of direct current, said motor being mechanically connected to drive a movable contact on the second potentiometer in response to the movements of a movable contact on the first potentiometer, a pair of saturable core reactors, each core reactor being provided with a core and an alternating winding, both of said windings being connected to the common terminal of the shading coil motor windings, and the other terminal of each winding being connected to one of the other terminals of the shading coil motor windings, a source of alternating current energizing said shading coil motor, the motor windings providing alternating current for energizing the A. C. windings on said core reactor, a direct current winding on each of said core reactors, said direct current windings being connected in reverse direction to the contacts of said potentiometers and to each other, a condenser connected in series with each A. C. winding on the core reactor to tune the circuit, a rectifier bridge having its A. C. junctions connected in series with the A. C. windings on the core reactor, D. C. biasing windings on each of said core reactors, each biasing winding being connected to the D. C. junctions of the corresponding rectifier, the biasing windings being in series with a controlling resistance, whereby only a predetermined portion of the output available at said rectifiers is fed back to the biasing winding of each core reactor for increasing the sensitivity of the circuit, the shading motor being driven in one direction when the contact on the first potentiometer moves in a predetermined first direction, and in the other direction when the potentiometer contact moves in the opposite direction, whereby the contact of the second potentiometer follows the contact of the first potentiometer until a condition of balance is secured, each of said core reactors being provided with a short circuited winding, whereby the energy interchange from one core reactor to the other is minimized, and the torque of the shading coil motor is increased.

7. In a controlling circuit, the combination of a shading coil motor with a first potentiometer and a second potentiometer connected to form a bridge, and energized by a source of direct current, said motor being mechanically connected to drive a movable contact on the second potentiometer in response to the movements of a movable contact on the first potentiometer, a pair of saturable core reactors, each core reactor being provided with a core and an alternating winding, both of said windings being connected to the common terminal of the shading coil motor windings, and the other terminal of each winding being connected to one of the other terminals of the shading coil motor windings, a source of alternating current energizing said shading coil motor, the motor windings providing alternating current for energizing the A. C. windings on said core reactor, a direct current winding on each of said core reactors, said direct current windings being connected in reverse direction to the contacts of said potentiometers and to each other, a condenser connected in series with each A. C. winding on the core reactor to tune the circuit, a rectifier bridge having its A. C. junctions connected in series with the A. C. windings on the core reactor, D. C. biasing windings on each of said core reactors, each biasing winding being connected to the D. C. junctions of the corresponding rectifier, the biasing windings being in series with a controlling resistance, whereby only a predetermined portion of the output available at said rectifiers is fed back to the biasing winding of each core reactor for increasing the sensitivity of the circuit, the shading motor being driven in one direction when the contact on the first potentiometer moves in a predetermined first direction, and in the other direction when the potentiometer contact moves in the opposite direction, whereby the contact of the second potentiometer follows the contact of the first potentiometer until a condition of balance is secured, each of said rectifiers having a condenser connected in shunt with its alternating current junctions for by-passing a component of double the frequency of that which is applied to the A. C. windings of the core reactor, increasing the efficiency of the circuit.

8. In a controlling circuit, the combination of a shading coil motor with a first potentiometer, and a second potentiometer connected to form a bridge, and energized by a source of direct current, said motor being mechanically connected to drive a movable contact on the second potentiometer in response to the movements of a movable contact on the first potentiometer, a pair of saturable core reactors, each core reactor being provided with a core and an alternating winding, both of said windings being connected to the common terminal of the shading coil motor windings, and the other terminal of each winding being connected to one of the other terminals of the shading coil motor windings, a source of alternating current energizing said shading coil motor, the motor windings providing alternating current for energizing the A. C. windings on said core reactor, a direct current winding on each of said core reactors, said direct current windings being connected in reverse direction to the contacts of said potentiometers and to each other, a condenser connected in series with each A. C. winding on the core reactor to tune the circuit, a rectifier bridge having its A. C. junctions connected in series with the A. C. windings on the core reactor, D. C. biasing windings on each of said core reactors, each biasing winding being connected to the D. C. junctions of the corresponding rectifier, the biasing windings being in series with a controlling resistance, whereby only a predetermined portion of the output available at said rectifiers is fed back to the biasing winding of each core reactor for increasing the sensitivity of the circuit, the shading motor being driven in one direction when the contact on the first potentiometer moves in a predetermined first direction, and in the other direction when the potentiometer contact moves in the opposite direction, whereby the contact of the second potentiometer follows the contact of the first potentiometer until a condition of balance is secured, the circuit connecting the D. C. windings on said core reactor including a pair of rectifiers connected in series between the D. C. coils, to permit the flow of current only in one direction, for increasing the efficiency of the control circuit.

EDWARD CARTOTTO.

REFERENCES CITED

The following references are of record in the file of this patent:

UNITED STATES PATENTS

| Number | Name | Date |
|---|---|---|
| 1,739,579 | Dowling | Dec. 17, 1929 |
| 2,200,968 | Runaldue | May 14, 1940 |
| 2,232,257 | Myles | Feb. 18, 1941 |
| 2,257,031 | Barth | Sept. 23, 1941 |
| 2,276,822 | Bowman | Mar. 17, 1942 |
| 2,331,698 | Keeler | Oct. 12, 1943 |
| 2,333,393 | Ryder | Nov. 2, 1943 |
| 2,346,838 | Haight | Apr. 14, 1944 |
| 2,358,243 | Moore | Sept. 12, 1944 |
| 2,377,474 | Alwein | June 5, 1945 |
| 2,414,936 | Edwards et al. | Jan. 28, 1947 |

Certificate of Correction

Patent No. 2,518,865                               August 15, 1950

EDWARD CARTOTTO

It is hereby certified that error appears in the printed specification of the above numbered patent requiring correction as follows:

Column 12, line 19, for the word "got" read *go*; column 13, line 42, for "amount or" read *amount of*; column 14, line 9, for "firt" read *first*;

and that the said Letters Patent should be read as corrected above, so that the same may conform to the record of the case in the Patent Office.

Signed and sealed this 24th day of October, A. D. 1950.

[SEAL]

THOMAS F. MURPHY,
*Assistant Commissioner of Patents.*